(12) United States Patent
Kawashima (10) Patent No.: US 9,729,069 B2
(45) Date of Patent: Aug. 8, 2017

(54) CONTROL DEVICE OF A SWITCHING POWER SUPPLY

(71) Applicant: FUJI ELECTRIC CO., LTD., Kawasaki-shi (JP)

(72) Inventor: Tetsuya Kawashima, Matsumoto (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 11 days.

(21) Appl. No.: 14/303,948

(22) Filed: Jun. 13, 2014

(65) Prior Publication Data

US 2015/0023066 A1 Jan. 22, 2015

(30) Foreign Application Priority Data

Jul. 17, 2013 (JP) ................................. 2013-148197

(51) Int. Cl.
  *H02M 3/335* (2006.01)
  *H02M 1/00* (2006.01)

(52) U.S. Cl.
  CPC ... *H02M 3/33546* (2013.01); *H02M 3/33515* (2013.01); *H02M 3/33553* (2013.01); *H02M 3/3353* (2013.01); *H02M 2001/0025* (2013.01); *H02M 2001/0058* (2013.01); *Y02B 70/1433* (2013.01); *Y02B 70/1491* (2013.01); *Y02P 80/112* (2015.11)

(58) Field of Classification Search
  CPC ...... H02M 3/33569; H02M 3/22; H02M 3/24; H02M 3/325; H02M 3/335; H02M 3/28; H02M 2007/4815; H02M 2007/4818

USPC .................................... 363/15, 16, 17, 18, 19
See application file for complete search history.

(56) References Cited

U.S. PATENT DOCUMENTS

| | | | |
|---|---|---|---|
| 6,437,994 B1 | 8/2002 | Blom et al. | |
| 2003/0137853 A1* | 7/2003 | Zaitsu ............... | H02M 3/33592 363/25 |
| 2010/0020569 A1* | 1/2010 | Melanson ................. | H01F 3/10 363/21.03 |
| 2011/0096571 A1* | 4/2011 | Usuda .................... | H02M 3/157 363/21.1 |
| 2012/0025720 A1* | 2/2012 | Chen ..................... | H02M 3/337 315/185 R |

(Continued)

FOREIGN PATENT DOCUMENTS

| | | |
|---|---|---|
| JP | 2003-510001 A | 3/2003 |
| JP | 2006-109566 A | 4/2006 |

(Continued)

*Primary Examiner* — Timothy J Dole
*Assistant Examiner* — Bryan R Perez
(74) *Attorney, Agent, or Firm* — Rabin & Berdo, P.C.

(57) ABSTRACT

A control section for a current resonant converter section controls a DC output voltage of a current resonant converter section to settle to a target voltage by varying a resonant period between predetermined two resonant periods based on an error signal between the DC output voltage and the target voltage. A gain converter is provided in a preceding stage of a frequency generator for generating a square waveform signal with a duty ratio of 50% and the gain converter has a setting of a nonlinear gain characteristic that cancels nonlinearity in the input-output characteristics of the current resonant converter section. The nonlinear gain characteristic can be a characteristic of continuous gain conversion or discrete gain conversion.

5 Claims, 11 Drawing Sheets (56) References Cited

U.S. PATENT DOCUMENTS

| | | | | |
|---|---|---|---|---|
| 2012/0033454 A1* | 2/2012 | Hosotani | .................. | H02M 1/34 |
| | | | | 363/21.03 |
| 2014/0002042 A1* | 1/2014 | Wismar | ................ | H02M 3/157 |
| | | | | 323/282 |
| 2014/0091718 A1* | 4/2014 | Brinlee | .............. | H05B 33/0815 |
| | | | | 315/185 R |
| 2014/0355313 A1* | 12/2014 | Nishikawa | ............ | H02M 1/081 |
| | | | | 363/17 |

FOREIGN PATENT DOCUMENTS

| | | |
|---|---|---|
| JP | 2006-204048 A | 8/2006 |
| JP | 2012-249363 A | 12/2012 |

\* cited by examiner

CONTROL DEVICE OF A SWITCHING POWER SUPPLY

CROSS-REFERENCE TO RELATED APPLICATION

This application is based on, and claims priority to, Japanese Patent Application No. 2013-148197, filed on Jul. 17, 2013, contents of which are incorporated herein by reference.

BACKGROUND OF THE INVENTION

1. Field of the Invention

The present invention relates to a control device of a switching power supply, and in particular to improvement of stability of an output voltage in a process of change in a setting value of the output voltage setting in a current resonant converter, a type of switching power supply.

2. Description of the Related Art

Current resonant type converters have been used for high efficient switching power supplies with reduced energy losses. A conventional current resonant converter has a construction described in the following.

Figure 10:
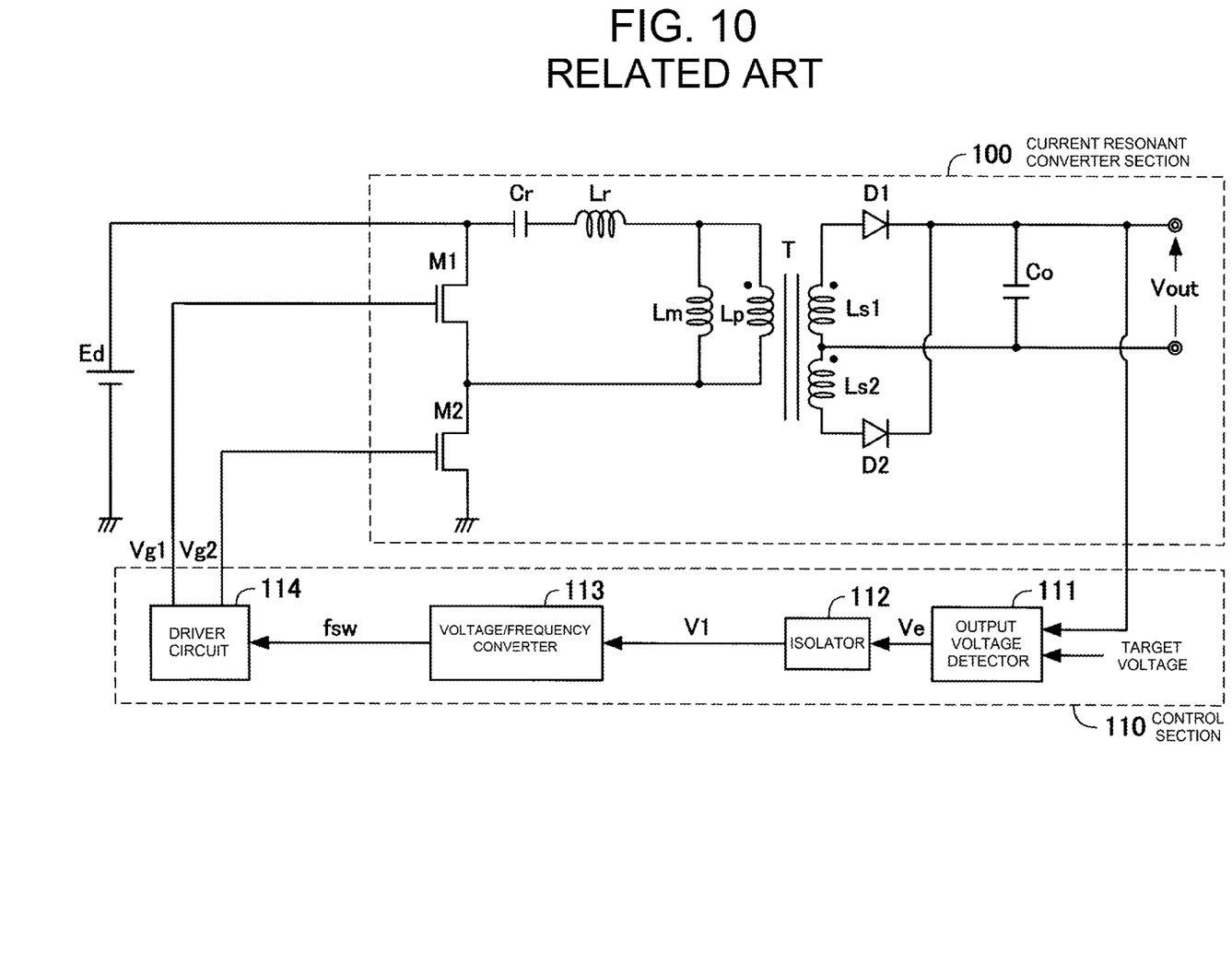
FIG. 10 shows an example of construction of a conventional current resonant converter.
Figure 11:
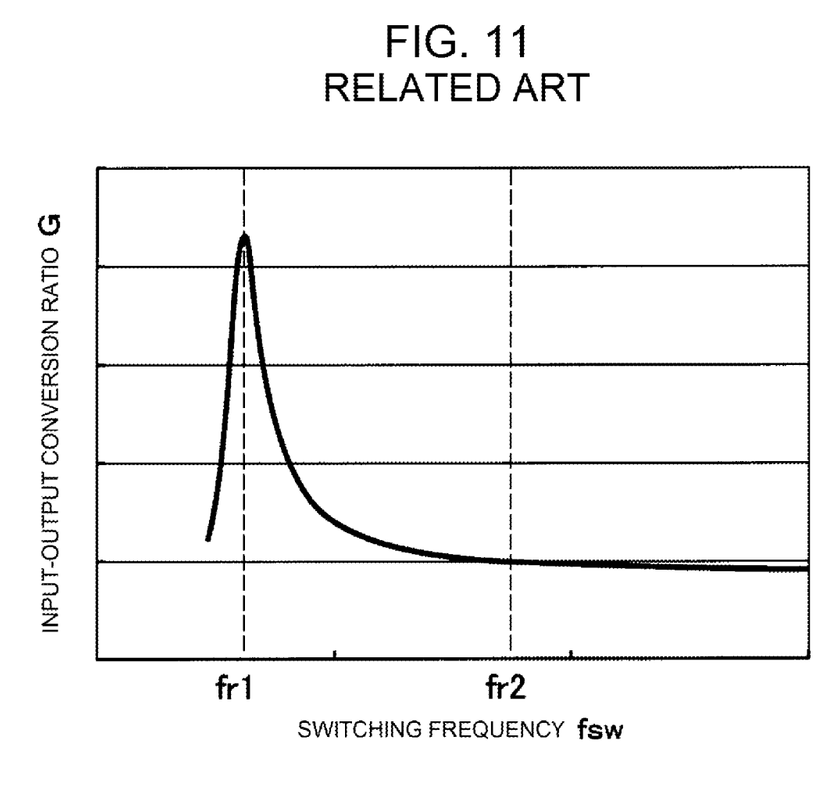
FIG. 11 shows an input-output characteristic, switching frequency dependence of input-output conversion ratio, of a current resonant converter section.

FIG. 10 shows an example of construction of a conventional current resonant converter. FIG. 11 shows an input-output characteristic, a switching frequency dependence of an input-output conversion ratio, of a current resonant converter section.

The current resonant converter having the construction of FIG. 10 comprises a current resonant converter section 100 and a control section 110. The current resonant converter section 100 includes two switching elements M1 and M2 connected in series, to which an input voltage Ed is applied. The switching element M1 is connected in parallel with a series circuit of a resonant capacitor Cr, a resonant inductance Lr, and a magnetizing inductance Lm. The magnetizing inductance Lm is connected in parallel with a primary winding Lp of a transformer T. The transformer T has secondary windings Ls1 and Ls2 provided with a center tap. Each end of the secondary winding of the transformer T is connected to an anode of each of two rectifying elements D1 and D2. Cathodes of the rectifying elements D1 and D2 are connected with each other and connected to the positive terminal of output terminals. The negative terminal of the output terminals is connected to the center tap between the secondary windings Ls1 and Ls2. A smoothing capacitor Co is connected between the cathodes of the rectifying elements D1 and D2, and to the center tap of the secondary windings Ls1 and Ls2.

In the current resonant converter section 100, a resonant circuit is constructed in the primary winding side of the transformer T with the two switching elements M1 and M2, the resonant inductance Lr, the resonant capacitor Cr, and the magnetizing inductance Lm. In a certain condition, the primary winding Lp of the transformer becomes a part of the resonance circuit. In the secondary side of the transformer T, a rectifying circuit is constructed with the two rectifying elements D1 and D2, and the smoothing capacitor Co.

The control section 110 comprises an output voltage detector 111 that receives a DC output voltage Vout and a target voltage and delivers an error signal Ve, an isolator 112, a voltage-frequency converter 113 that receives an output signal V1 from the isolator 112 and delivers a pulse waveform signal with a switching frequency fsw, and a driver circuit 114. The driver circuit 114 delivers control signals Vg1 and Vg2 for ON/OFF controlling the switching elements M1 and M2 of the current resonant converter section 100.

In the control section 110, the output voltage detector 111 detects an error between the DC output voltage Vout and the target voltage and delivers an error signal Ve representing the error, which is received by the isolator 112 that delivers an output signal V1 that is electrically isolated from the error signal Ve. The output signal V1 is converted into a switching signal having a desired switching frequency fsw by the voltage-frequency converter 113. The switching signal is converted by the driver circuit 114 into control signals Vg1 and Vg2 to supply to the two switching elements M1 and M2.

Thus, the control section 110 controls the switching elements in the current resonant converter section 100, and the current resonant converter performs as a DC-DC converter that delivers a desired DC output voltage Vout from the input voltage Ed.

In a current resonant converter, a DC output voltage Vout is generally controlled by varying the switching frequencies of the switching elements M1 and M2, as disclosed in Patent Document 1, for example. The two switching elements M1 and M2 are turned ON/OFF complementarily, and preferably switched with the same ON time, which means the duty ratio of 50%, according to Patent Documents 1 and 2 (identified further on).

The current resonant converter of the figure has two resonant frequencies fr1 and fr2 (fr1<fr2) and the switching frequency of the switching elements M1 and M2 varies between the resonant frequency fr1 and the resonant frequency fr2. FIG. 11 shows a relationship between an input-output conversion ratio G and a switching frequency fsw. It is known that the input-output conversion ratio G exhibits a peak at the lower resonant frequency fr1, as disclosed in Patent Document 3 (identified further on). The resonant frequencies fr1 and fr2 are represented by the formula (1) and (2) below.

$$fr1 = 1/[2\pi\sqrt{((Lr+Lm)*Cr)}] \quad (1)$$

$$fr2 = 1/[2\pi\sqrt{(Lr*Cr)}] \quad (2)$$

As shown in FIG. 11, switching loss sharply increases when the switching frequency decreases below the lower resonant frequency fr1. Thus, the switching frequency is used in the range not lower than the resonant frequency fr1. At the higher resonant frequency fr2, the input-output conversion ratio G equals 1, which means that the primary side voltage directly appears at the output voltage. In switching frequencies above the higher resonant frequency fr2, the input-output conversion ratio G does not change despite change of the switching frequency as shown in FIG. 11. As a result, the output voltage scarcely changes, which means control of the output voltage is virtually impossible.

For this reason, the switching frequency is varied in the range from the resonance frequency fr1 to the resonance frequency fr2 to control the output voltage. The output voltage is increased by decreasing the switching frequency in the range between the resonance frequencies fr1 and fr2, and the output voltage is decreased by increasing the switching frequency.

In the construction of FIG. 10, the output voltage detector 111 detects the error between the DC output voltage Vout and the target voltage, and the voltage-frequency convertor 113 generates a pulse waveform signal having a switching frequency fsw corresponding to the error voltage. The driver circuit 114, receiving the pulse waveform signal having a switching frequency fsw, gives the control signals Vg1 and Vg2 to the two switching elements M1 and M2. Thus, the current resonant converter section 100 is controlled to be settled to a desired output voltage.

[Patent Document 1]

Japanese Unexamined Patent Application Publication No. 2006-109566

[Patent Document 2]

Japanese Translation of PCT International Application: 2003-510001 corresponding to International Publication Number WO01/20758

[Patent Document 3]

Japanese Unexamined Patent Application Publication No. 2012-249363

However, the input-output characteristic of FIG. 11 shows a nonlinear characteristic. The variation of the input-output conversion ratio G, or the variation of the DC output voltage Vout with respect to the variation of a switching frequency, differs depending on the output voltage setting value or the target voltage. As a result, when a setting value of output voltage is changed, the output voltage varies slowly to the new output voltage value in the range of low output voltages, but in the range of high output voltages, the output voltage varies abruptly causing overshooting, which may subject the load to an overvoltage and sometimes destroy the load. If the overshoot occurs under a light load condition, in particular, it takes a long settling time to recover the target voltage.

In order to avoid this problem, it could be considered that the control gain was decreased in the control section including the output voltage detector and the voltage-frequency convertor. However, in cases of low output voltages, this measure elongates greatly the time period for the output voltage to settle to the target voltage after a change of the setting value of the output voltage. Therefore, the means of decreasing the control gain of the control section cannot be employed for avoiding the overshoot. Although the above Patent Documents describe control of current resonant converters, they do not mention a response to change of a setting value of output voltage.

SUMMARY OF THE INVENTION

The present invention has been made in view of the situation and an object of the present invention is to provide a control device of a switching power supply in which the output voltage settles fast to a target value without overshooting in the process of change of setting value of the output voltage.

In order to solve the above problem, the present invention provides a control device of a switching power supply that has a current resonant converter section. The control device comprises an output voltage detector that detects an error between a DC output voltage of the current resonant converter section and a target voltage and delivers an error signal, an analog-digital converter that converts the error signal detected by the output voltage detector into a digital signal, a gain converter that receives the digital signal delivered by the analog-digital converter, and a frequency generator that changes an output signal period to determine a switching period of the switching power supply in proportion to a digital signal delivered by the gain converter and generates an output signal of a rectangular waveform signal with a duty ratio of 50%. A gain characteristic from an input to output of the gain converter is set so that a nonlinear gain characteristic of the gain converter compensates a nonlinear input-output characteristic of the current resonant converter section in a predetermined input range.

A control device of a switching power supply as stated above can obtain linear approximation of a gain characteristic of a system in combination with a current resonant converter section and restrict overshooting of output voltage due to partial gain rise in a predetermined input range.

In the control device of a switching power supply having the construction described above, the characteristic of the gain converter is given so as to cancel the nonlinearity of the gain of the current resonant converter section. Consequently, even when a setting value of output voltage is changed abruptly under the condition of a high input-output conversion ratio of the current resonant converter section, the load is not subjected to an overvoltage and is prevented from break-down. In addition, also under the condition of a low input-output conversion ratio of the current resonant converter section, the DC output voltage is settled fast. Therefore, the load starts operation at the settled DC output voltage.

BRIEF DESCRIPTION OF DRAWINGS

FIGS. 7A and 7B show response waveforms of output voltage using a linear gain convertor, in which FIG. 7A shows a case of low gain in the current resonant converter section and FIG. 7B shows a case of high gain;

FIGS. 8A and 8B show response waveforms of output voltage using a non-linear gain convertor, in which FIG. 8A shows a case of low gain in the current resonant converter section and FIG. 8B shows a case of high gain;

DETAILED DESCRIPTION OF THE INVENTION

Some preferred embodiments of the present invention will be described in detail in the following with reference to the accompanying drawings. The description will be made in terms of a switching period, a reciprocal of a switching frequency, in place of the conventional switching frequency, for controlling the current resonant converter. The aspects of the invention can be applied in combination of multiple aspects as long as no contradiction is contained.

Figure 1:
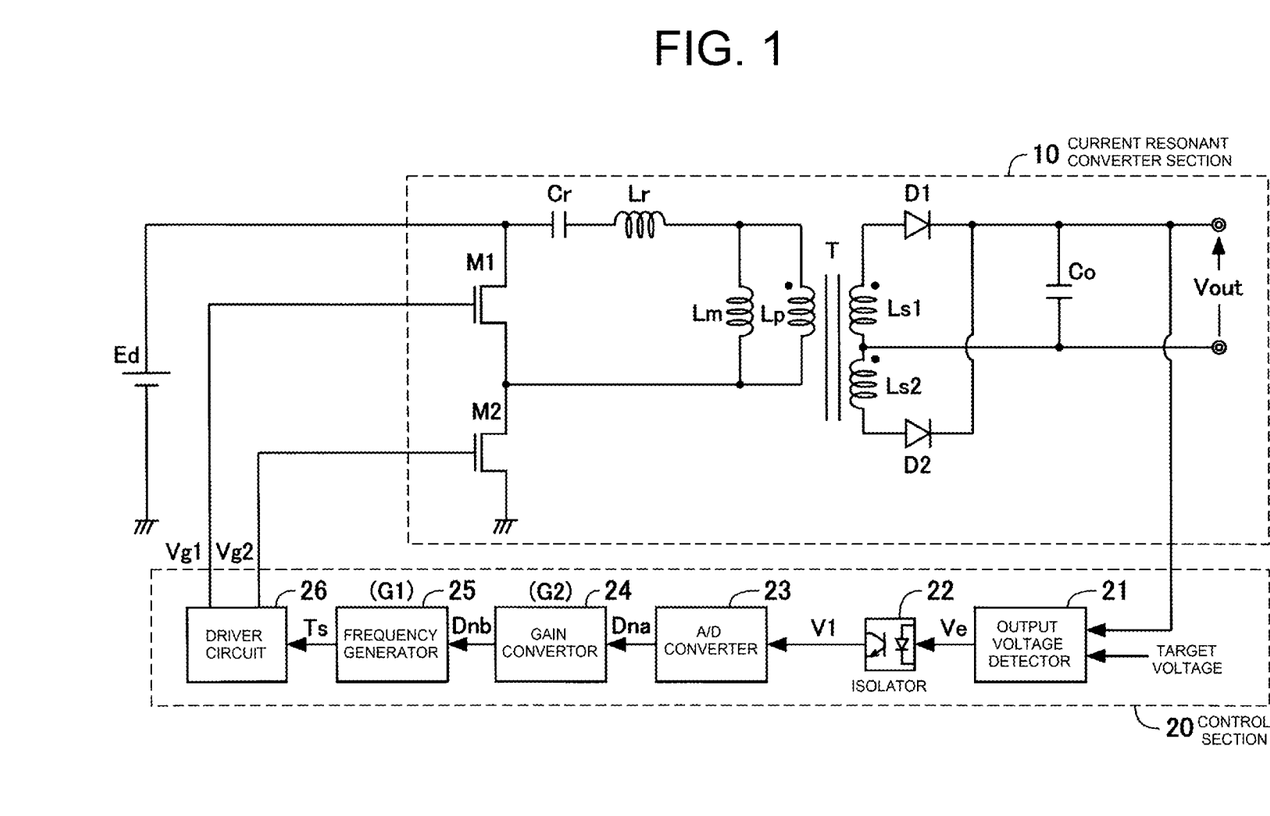
FIG. 1 shows an example of construction of a current resonant converter to which a control device of a switching power supply according to a first embodiment of the present invention is applied.
Figure 2:
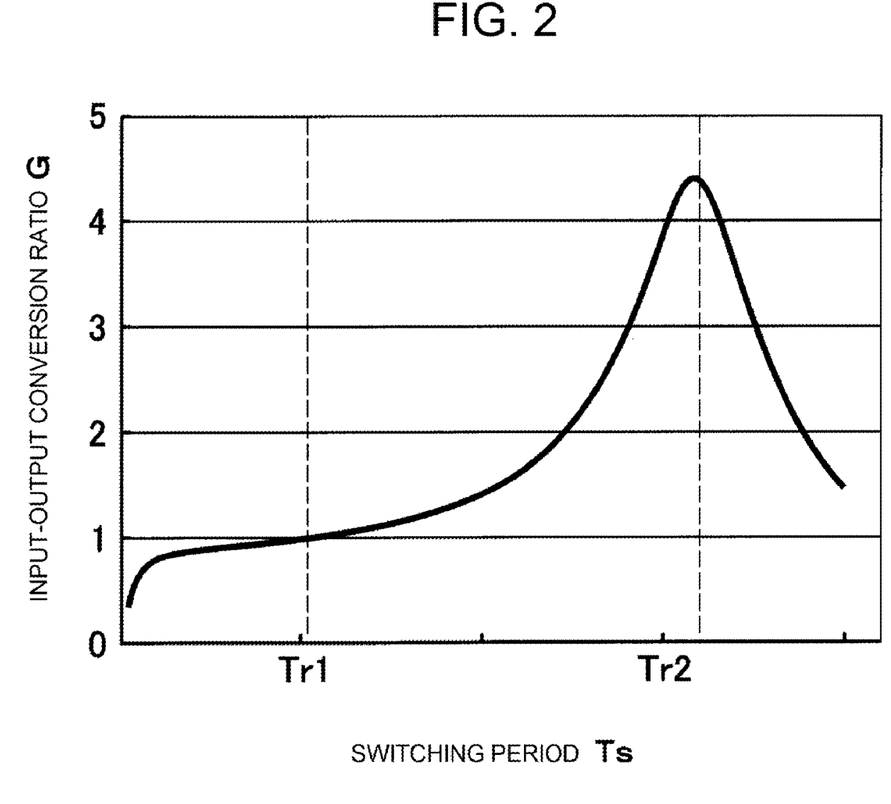
FIG. 2 shows an input-output characteristic, switching period dependence of input-output conversion ratio, of a current resonant converter section.

FIG. 1 shows an example of construction of a current resonant converter to which a control device of a switching power supply according to a first embodiment of the present invention is applied. FIG. 2 shows an input-output characteristic, switching period dependence of input-output conversion ratio, of a current resonant converter section.

The current resonant converter having the construction of FIG. 1 comprises a current resonant converter section 10 and a control section 20. The current resonant converter section 10 includes two switching elements M1 and M2 connected in series, to which a DC input power supply is connected and an input voltage Ed is applied. The switching element M1 is connected in parallel with a series circuit of a resonant capacitor Cr, a resonant inductance Lr, and a magnetizing inductance Lm. The magnetizing inductance Lm is connected in parallel with a primary winding Lp of a transformer T. The transformer T has secondary windings Ls1 and Ls2 provided with a center tap. Each end of the transformer T is connected to an anode of each of two rectifying elements D1 and D2. Cathodes of the rectifying elements D1 and D2 are connected with each other and connected to the positive terminal of output terminals. The negative terminal of the output terminals is connected to the center tap between the secondary windings Ls1 and Ls2. A smoothing capacitor Co is connected between the cathodes of the rectifying elements D1 and D2, and the center tap of the secondary windings Ls1 and Ls2.

In the current resonant converter section 10, a resonant circuit is constructed in the primary winding side of the transformer T, with the two switching elements M1 and M2, the resonant inductance Lr, the resonant capacitor Cr, and the magnetizing inductance Lm. In a certain condition, the primary winding Lp of the transformer becomes a part of the resonant circuit. In the secondary side of the transformer T, a rectifying circuit is constructed with the two rectifying elements D1 and D2, and the smoothing capacitor Co.

The control section 20 comprises an output voltage detector 21, an isolator 22, an analog to digital converter (hereinafter referred to as an A-D converter) 23, a gain converter 24, a frequency generator 25, and a driver circuit 26 connected in series in this order. The output voltage detector 21 receives a DC output voltage Vout and a target voltage and detects the error between the two voltages, delivering an error signal Ve that represents the magnitude of the error. The isolator 22 transmits a signal from the secondary side to the primary side electrically isolating the two sides. The isolator 22 uses a photo-coupler that receives an error signal Ve and delivers an output signal V1 that corresponds to the error signal Ve. The A-D converter 23 receives an output signal V1 and converts an analog value corresponding to the error signal Ve to a digital value. The gain converter 24 receives the digital value corresponding to the error signal Ve and regulates the gain characteristic of the current resonant converter as a whole according to a predetermined input-output characteristic, or a gain characteristic. The frequency generator 25, receiving the output of the gain converter 24, delivers a pulse waveform signal having a switching period Ts corresponding to the received signal. The driver circuit 26 delivers control signals Vg1 and Vg2 for ON/OFF-controlling the switching elements M1 and M2.

The control section 20 varies the switching period Ts of the control signals Vg1 and Vg2 for driving the switching elements M1 and M2 based on the DC output voltage Vout to control the DC output voltage Vout to become the target voltage. The input-output characteristic of the current resonant converter section 10 is as shown in FIG. 2 and is a nonlinear one just as the input-output characteristic of the current resonant converter section with respect to switching frequency shown in FIG. 11. FIG. 2 is represented in terms of variation of the switching period Ts which is an inverse of the switching frequency. Thus, the resonant frequency fr1 in FIG. 11 is replaced by the resonant period Tr2 in FIG. 2 and the resonant frequency fr2 is replaced by the resonant period Tr1. The switching period Ts to be controlled is generally varied between the two resonant periods Tr1 and Tr2, which is similar to the case of FIG. 11. The essential point of the present invention is that the input-output characteristic, which is a gain characteristic, of the gain converter 24 is determined so as to cancel the nonlinearity of the input-output characteristic between the resonant periods Tr1 and Tr2. As a result, overshoot of the output voltage does not occur when a setting value of the output voltage is changed.

The following describes how the input-output characteristic of the gain converter 24 is set.

Figure 3:
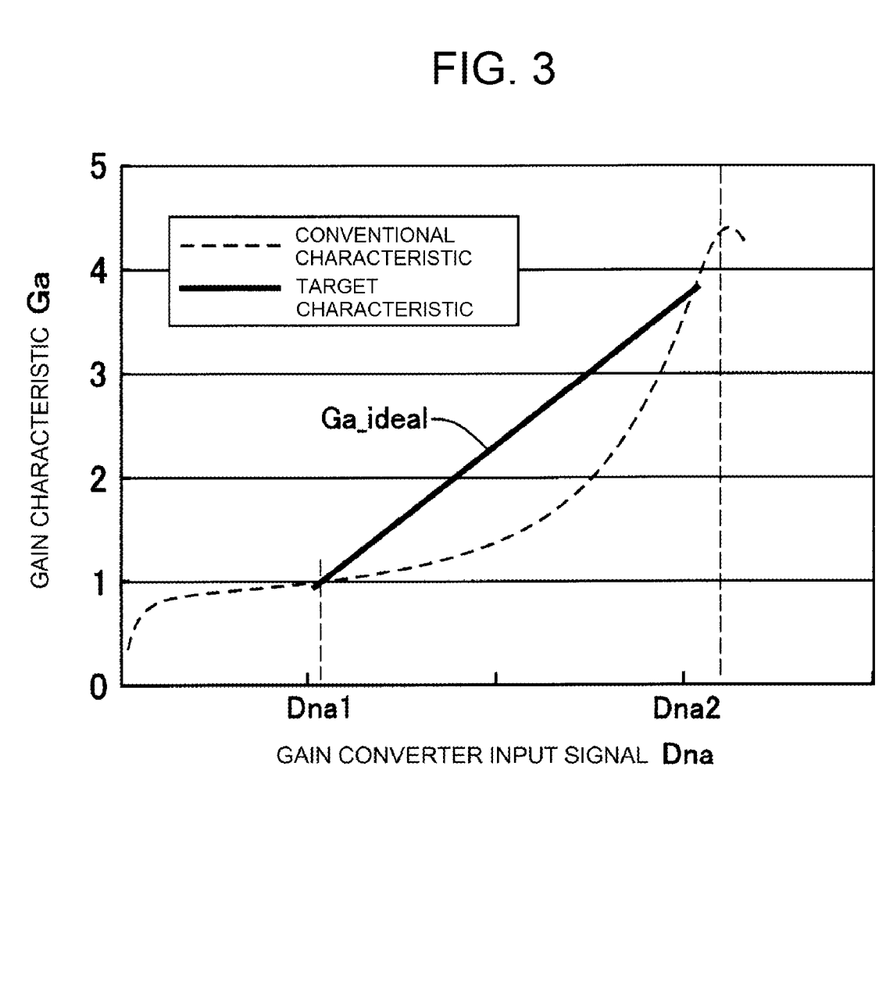
FIG. 3 shows a target input-output characteristic in the present invention.
Figure 4:
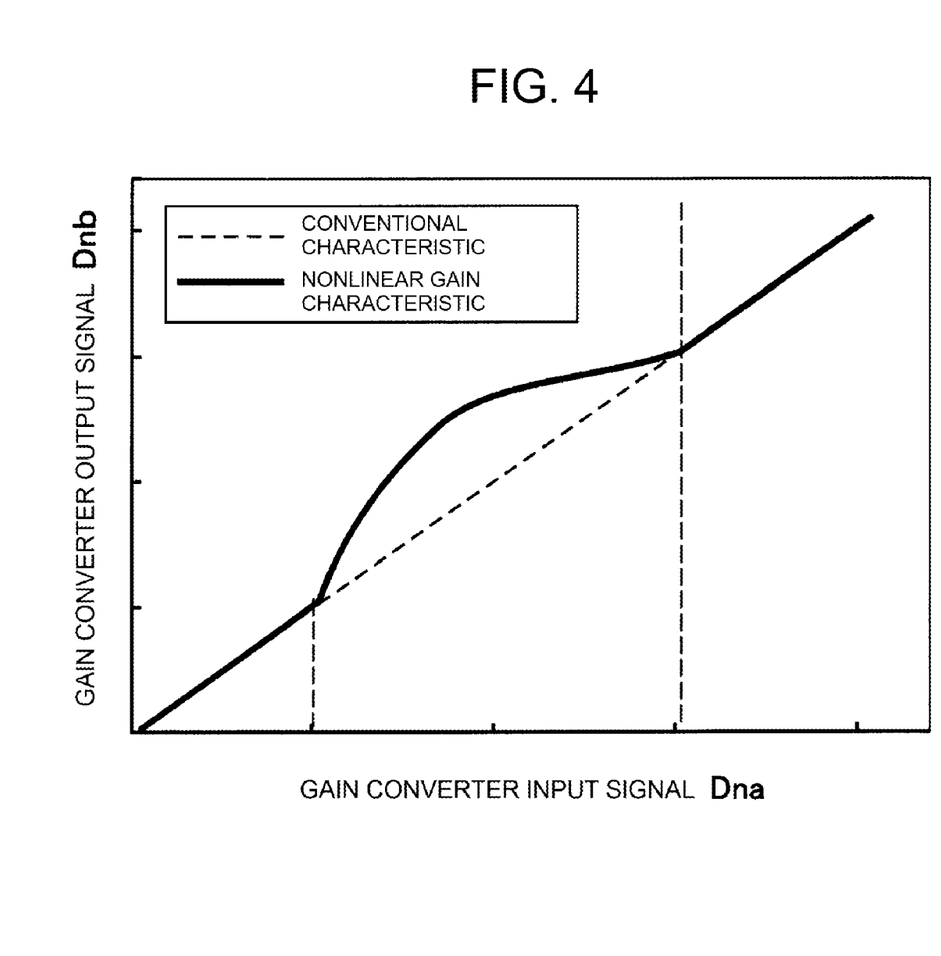
FIG. 4 shows an ideal gain converter characteristic in the present invention.
Figure 5:
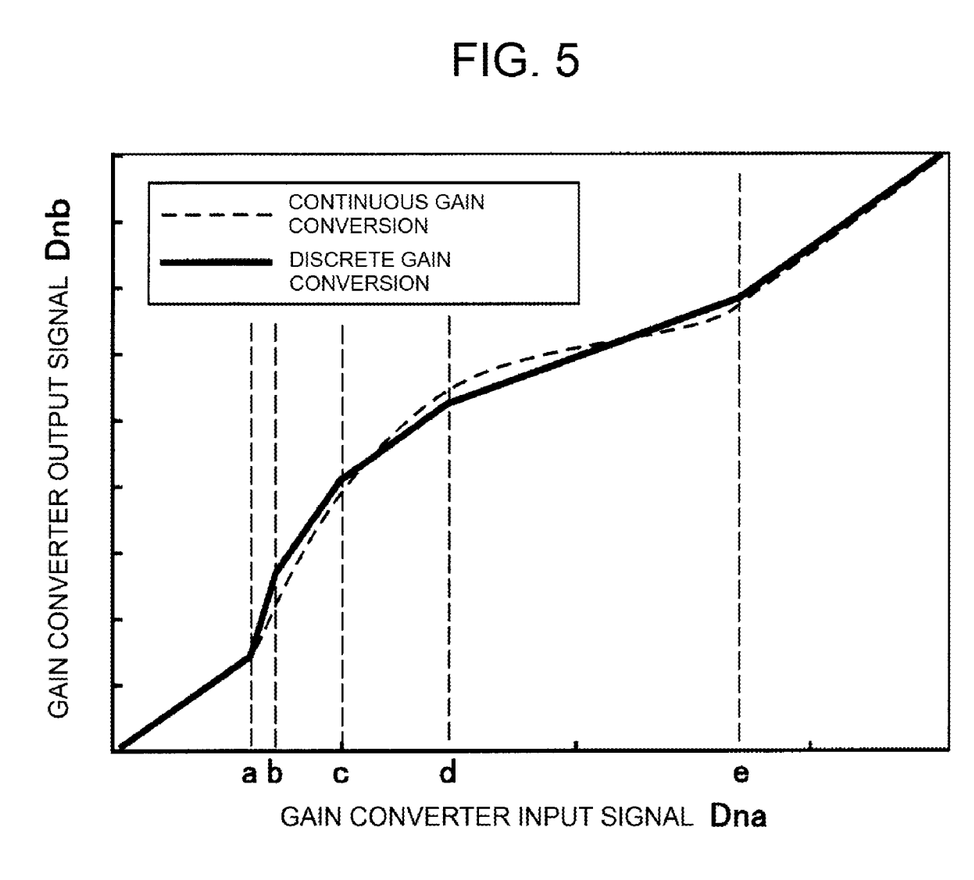
FIG. 5 shows a practical gain converter characteristic in the present invention.

FIG. 3 shows a target input-output characteristic in the present invention; FIG. 4 shows an ideal gain converter characteristic in the present invention; and FIG. 5 shows a practical gain converter characteristic in the present invention.

In order to determine the characteristic of the gain converter 24, the input-output characteristic of the current resonant converter section must be known. The input-output characteristic has a waveform as shown in FIG. 2 having a peak. The waveform is accurately represented by the following formula (3).

$$G = \frac{1}{1 + \frac{Lr}{Lm}\left(1 - \frac{fr2^2}{fs^2}\right) + j\sqrt{\frac{Lr}{Lm}} \frac{\pi^2}{8N^2} \frac{1}{Ro}\left(\frac{fs}{fr2} - \frac{fr2}{fs}\right)} \quad (3)$$

Here, Lr designates a resonant inductance; Lm, a magnetizing inductance; fr2, the resonant frequency represented by the formula (2); fs, a switching frequency, which is an inverse of the switching period Ts; N, a winding ratio of the transformer T; and Ro represents a load resistance.

The formula (3) is too complicated to represent the input-output characteristic of FIG. 2, and an approximate formula of a lower order is desired. Fortunately, most current resonant converters are used only in the range of resonant period of Tr1 to Tr2. Consequently, confining the period range within this range, the following formula (4) of a third order approximation is valid for an input-output conversion ratio G of the current resonant converter section 10 as a function of the switching period Ts.

$$G(Ts) = a3*Ts^3 + a2*Ts^2 + a1*Ts + a0 \quad (4)$$

The coefficients a0, a1, a2, and a3 can be obtained by generating a graphical representation in the range of the Ts between the resonant periods Tr1 and Tr2 using spreadsheet software, and then by using curve fitting function of the spreadsheet software.

Now a case is considered in which the characteristics of the frequency generator 25 and the gain converter 24 are linear. Supposed that G1 represents a constant gain of the frequency generator 25, which generates a pulse signal of the switching period Ts that becomes a control signal for the current converter section 10, and that G2 represents a gain of the gain converter 24 and equals to 1. Input and output signals of the gain converter 24 are designated as Dna and Dnb, respectively. In this case, the switching period Ts is given by the formula (5), and the gain characteristic Ga of a combination of the gain converter 24, which is assumed to be linear, and the current resonant converter section 10 is given by the formula (6).

$$Ts = G1 * Dnb, Dnb = Dna \quad (5)$$

$$Ga(Ts) = Ga(G1 * G2 * Dna) \quad (6)$$
$$= Ga(G1 * Dna)$$
$$= c3 * Dna^3 + c2 * Dna^2 + c1 * Dna + c0$$

wherein c0=a0, c1=a1*G1, c2=a2*G1², c3=a3*G1³.

From the formulas (4), (5), and (6), the characteristic curve of the gain characteristic Ga for the input signal Dna to the gain converter 24 as shown by the broken curve in FIG. 3 can be determined. Dna1 and Dna2 of the input signal Dna to the gain converter 24 corresponding to the resonant periods Tr1 and Tr2 are represented by Dna1=Tr1/G1 and Dna2=Tr2/G1.

Then a target formula for an overall gain characteristic is determined in the case of combination of the gain converter 24 that is considered nonlinear and the current resonant converter section 10. Here, the target gain characteristic Ga_ideal indicated by the solid line in FIG. 3 is determined from the curve indicated by the broken curve in FIG. 3 drawn according to the formula (6).

The target characteristic makes the magnitude of output voltage variation be a constant value for the switching period Ts independently of the output voltage in the range between the two resonant periods Tr1 and Tr2. The target gain characteristic Ga_ideal can be determined by the straight line connecting the point (Dna, G(Dna)) and the point (Dnb, G(Dnb)), wherein the G(Dna) and the G(Dnb) are input-output conversion ratios at input signals Dna1 and Dna2 corresponding to the resonant periods Tr1 and Tr2 obtained from the formula (4). Thus, $$Ga\_ideal = d1 * Dna + d0 \quad (7)$$

Here, d0 and d1 are coefficients.

The formulas (3) through (7) obtained so far are determined in the range between the two resonance periods. However, the switching period is not necessarily between the two resonant periods as far as it is lower than the second resonant period Tr2. The switching period range for determining approximation formula can be changed according to the range of the output voltage specification of a switching power supply.

Next, a characteristic formula will be found that is required by the gain converter 24 in order to attain the target gain characteristic Ga_ideal. First, the ideal characteristic shown by the solid line in FIG. 3 allows to be found, corresponding to arbitrary four points of input signals Dna (Dna3, Dna4, Dna5, and Dna6), target gain characteristics Ga_ideal (Ga_ideal3, Ga_ideal4, Ga_ideal5, and Ga_ideal6). Any of the input signals Dna3 through Dna6 can be identical to the input signal Dna1 or Dna2. The characteristics are the ones in the case a nonlinear gain is set in the gain converter 24, and the output signal Dnb of the gain converter 24 is an unknown quantity.

Because the gain characteristic G1 of the frequency generator 25 and the input-output conversion ratio G of the current resonant converter section 10 do not change in the case of applying a nonlinear gain, the formula (4) and the first equation of the formula (5), Ts=G1*Dnb, lead to the following formula (8).

$$Ga\_ideal = c3 * Dnb^3 + c2 * Dnb^2 + c1 * Dnb + c0 \quad (8)$$

This formula (8) and the four target gain characteristics obtained earlier, Ga_ideal (Ga_ideal3, Ga_ideal4, Ga_ideal5, and Ga_ideal6), allow to be found output signals Dnb (Dnb3, Dnb4, Dnb5, and Dnb6) of the nonlinear gain characteristics corresponding to each target gain characteristic Ga_ideal. Specific values of these output signals Dnb are calculated using numerical analysis software.

Thus, a relationship between input and output of the nonlinear gain is obtained: the outputs Dnb3, Dnb4, Dnb5, and Dnb6 are obtained corresponding to the input signals Dna3, Dna4, Dna5, and Dna6. Because there are four points of information, an approximation equation for the characteristic equation of the gain converter 24 can be represented by a cubic equation. The following formula (9) can be applied to the relationship between the output signal Dnb and the input signal Dna.

$$Dnb = e3 * Dna^3 + e2 * Dna^2 + e1 * Dna + e0 \quad (9)$$

FIG. 4 shows a graphic representation of the formula (9). Of course, the order of approximation equation that represents the characteristic of the gain converter can be increased by increasing the number of points from the ideal characteristic shown in FIG. 3. The coefficients e3, e2, e1, and e0 in the formula (9) can be determined from the simultaneous equations (10) through (13) below, thereby determining an equation to represent the curve of FIG. 4.

$$Dnb1 = e3 * Dna1^2 + e2 * Dna1^2 + e1 * Dna1 + e0 \quad (10)$$

$$Dnb2 = e3 * Dna2^2 + e2 * Dna2^2 + e1 * Dna2 + e0 \quad (11)$$

$$Dnb3 = e3 * Dna3^2 + e2 * Dna3^2 + e1 * Dna3 + e0 \quad (12)$$

$$Dnb4 = e3 * Dna4^2 + e2 * Dna4^2 + e1 * Dna4 + e0 \quad (13)$$

For input values outside the input range of the ideal characteristic, the gain converter 24 is supposed linear, and the overall characteristic of the gain converter 24 has a nonlinear characteristic as shown in FIG. 4.

The calculations described above give a linear or quasi-linear gain characteristic Ga for the combination of the gain converter 24, the frequency generator 25, and the current resonant converter section 10.

The characteristic of the gain converter 24 following the formula (9) can simply be achieved by constructing the gain converter 24 with a digital operating unit. In order to actualize the gain converter 24 of a digital operating unit, an A-D converter 23 is provided in front of the gain converter 24 in the present invention. Thus, ideally, a constant gain characteristic can be obtained in the range of the output voltage specification, and a similar response characteristic can be achieved irrespective of output voltage values for change of output voltage setting.

Because the frequency generator 25 delivers a pulse signal with a period proportional to the digital signal from the gain converter 24, the change of the output signal Dnb corresponding to the change of the input signal Dna is very small in the case of a large input signal Dna as in the example shown in FIG. 4. Consequently, high resolution is required by the frequency generator 25, sometimes as high as ten times or more as compared with the case that does not use the gain converter 24.

As a result, a circuit scale of the gain converter 24 is enlarged and a circuit area and power consumption of the frequency generator 25 are substantially increased.

The control device of this embodiment example does not use a circuit that faithfully carries out the formula (9), but uses an approximation of the formula (9), thereby avoiding very high resolution. More specifically, in the example of FIG. 5, the range of period for gain conversion, between the two resonant periods Tr1 and Tr2, is divided into four regions between the five points a, b, c, d, and e. A gain is set in each region. The gain is not continuous with respect to the input signal Dna as is the case of FIG. 4, but changes discretely from a region to region. The points a through e are determined by so adjusting that the characteristics give a graph similar to the curve in FIG. 4. Moreover, the gain of each region is determined to be $2^N$ of a basic gain, N being a positive or negative integer. This eliminates needs for a multiplier and an adder, and only needs a shift operator for the operation in the gain converter 24. Thus, the increase in a circuit area due to addition of the gain converter 24 is suppressed to a minimal value.

The basic gain is determined to be in the range of ½ to ⅛ of the case without the gain converter 24. Consequently, the increase in resolution of the frequency generator 25 is restricted to 2 times to four times, at most eight times. In the gain converter 24, the points at which the gain is changed and the value of gain in each region can be arbitrarily set according to the formula (9).

The following describes another method to determine the characteristics of the gain converter 24. The basic gain in this case is the gradient of the conventional characteristic shown by the broken line in FIG. 4, which is the gain characteristic G2 of the gain converter 24. Although G2=1 in the above description, other values are also possible in the above reasoning.

The gain of each segment of lines is $G2*2^j$, j being ... −2, −1, 0, 1, 2, ... and the gradient at the point where the gain changes is determined to be an arithmetic mean or a geometrical mean of the gradients of the adjacent line segments. For a G2j, which is a G2 value that equals to $G2*2^j$, the point at which the gradient of the curve representing the nonlinear gain characteristic shown in FIG. 4 equals to (G2j+G2(j+1)) or to $\sqrt{(G2j*G2(j+1))}$ can be determined, for example, using numerical analysis software.

Now, operation of the control section 20 provided with the gain converter 24 is described in the following.

Figure 6:
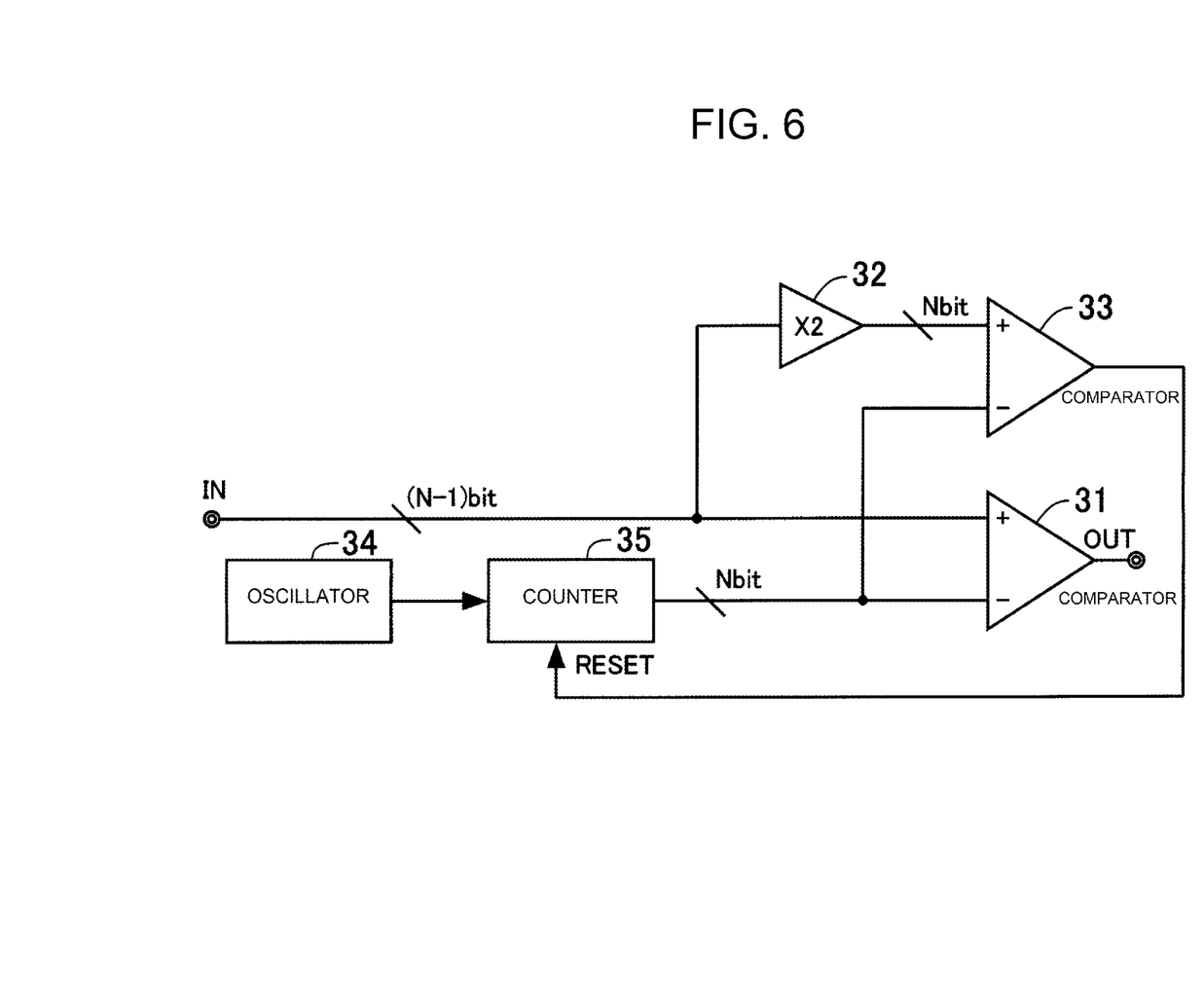
FIG. 6 shows an example of construction of a frequency generator.
Figure 7A:
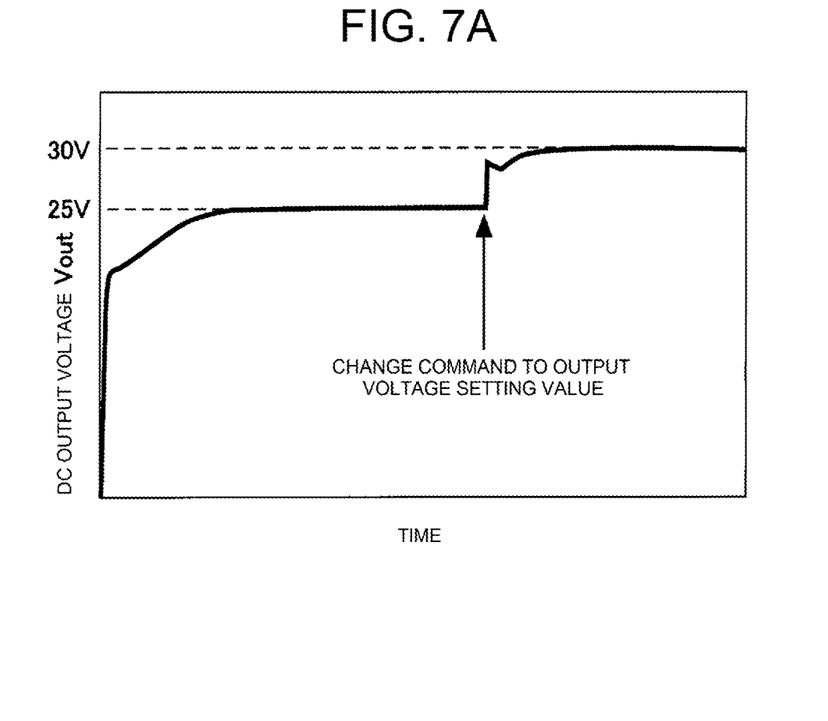
Figure 7B:
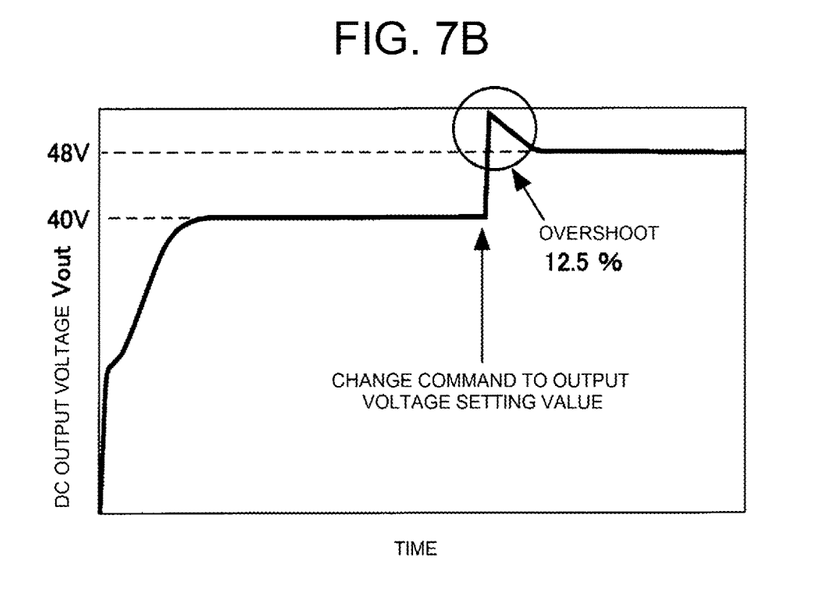
Figure 8A:
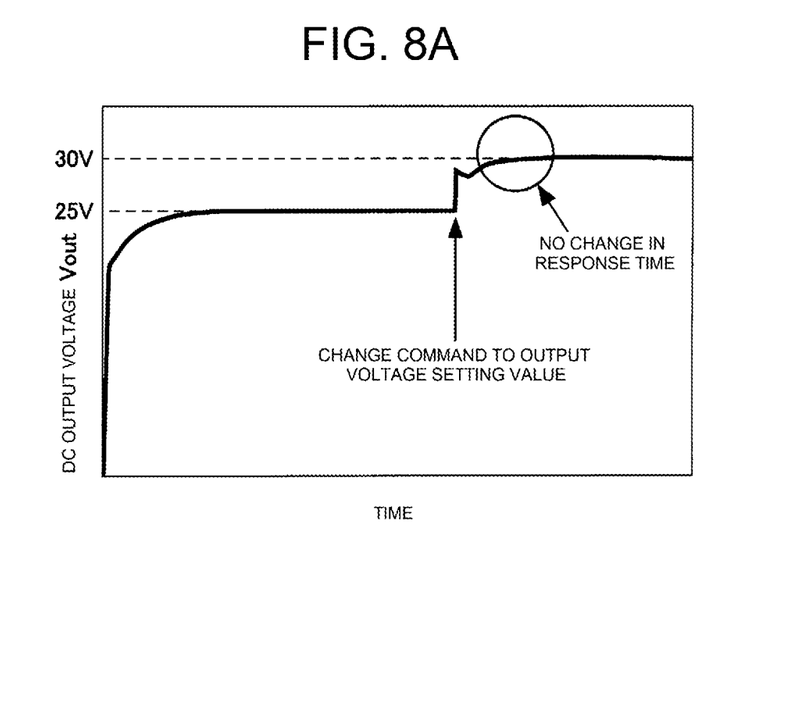
Figure 8B:
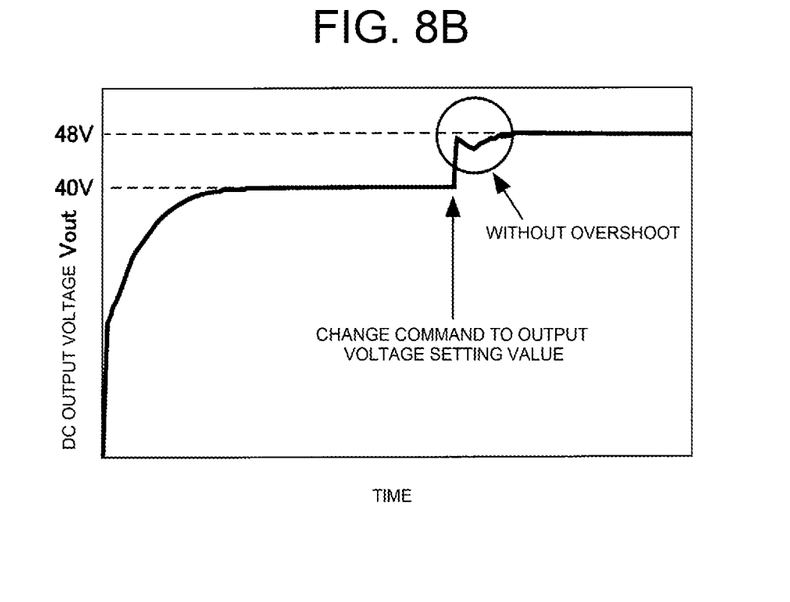

FIG. 6 shows an example of construction of a frequency generator. FIGS. 7A and 7B show response waveforms of output voltage using a linear gain convertor, in which FIG. 7A shows a case of low gain in the current resonant converter section and FIG. 7B shows a case of high gain. FIGS. 8A and 8B show response waveforms of output voltage using a non-linear gain convertor, in which FIG. 8A shows a case of low gain in the current resonant converter section and FIG. 8B shows a case of high gain.

First, description is made of the case in which the characteristic of the gain converter 24 is 1 throughout the possible input range, in the construction of the present invention. In the construction of FIG. 1, the output voltage detector 21, disposed in the secondary side of the transformer T at the same potential as the DC output voltage Vout, detects an error between the DC output voltage Vout and the target voltage, and delivers an error signal Ve. The error signal Ve is transmitted, through the isolator 22, to the A-D converter 23 disposed in the primary side of the transformer T as an output signal V1. The A-D converter 23 converts the output signal V1 corresponding to the error signal Ve to a digital value. Since the gain of the gain converter 24 is 1 in this case, the output from the A-D converter 23 is directly given to the frequency generator 25.

FIG. 6 shows a construction of the frequency generator 25. The frequency generator 25 has an input terminal IN for receiving the digital signal Dnb transmitted by the gain converter 24 and an output terminal OUT for transmitting the generated switching period Ts to the driver circuit 26. The input terminal IN is connected to a first input (+) of a digital first comparator 31 and at the same time, through a multiplier 32, to a first input (+) of a digital second comparator 33. The second inputs (−) of the first and second comparators 31 and 33 are connected to an output of a counter 35 that receives the output of an oscillator 34. The output of the first comparator 31 constructs the output terminal OUT; the output of the second comparator 33 is connected to a RESET terminal of the counter 35.

The frequency generator 25 generates a pulse signal with a duty ratio of 50% in a period corresponding to an input signal. The first comparator 31 determines the ON period of the output signal, and the second comparator 33 determines the period of the output signal. Accordingly, the second comparator 33 receives a signal obtained by doubling the input signal for determining the ON period by the multiplier 32, that is, a signal that is made to be N bits by adding one bit to the input signal of (N−1) bits.

The first comparator 31 delivers an output at a high level when the counter 35 is reset and all the output bits of the counter 35 turn to a low level, and delivers an output at a low level when the (N−1) bits of the input signal coincide with lower (N−1) bits of the N bits delivered from the counter 35, thereby determining the ON period. The low level output is kept until the counter 35 is next reset. The second comparator 33 delivers an output at a high level when the counter 35 is reset, and delivers a reset signal at a low level when the N bits from the multiplier 32 coincide with the N bits delivered from the counter 35, thereby resetting the counter 35. Thus, the frequency generator 25 generates a pulse signal with a duty ratio of 50% in a period corresponding to the input signal. In an example of given specifications of a minimum changing width of a switching period of 80 nsec and a maximum output switching period of 40 psec, the oscillator 34 needs an oscillation period of 40 ns and the counter 35 needs to be a ten bit counter, and the input signal needs to be composed of nine bits.

The pulse signal delivered by the frequency generator 25 is sent to the driver circuit 26, and there, converted to control signals Vg1 and Vg2 that are given a dead time in order to prevent the two switching elements M1 and M2 from simultaneously turning ON and an electric current from flowing through the switching elements. The control signals Vg1 and Vg2 are delivered to the gate terminals of the switching elements M1 and M2. In this construction, the current resonant converter is frequency controlled for the output voltage to settle to a predetermined desired value.

An example is shown here of response of the output voltage when a setting value of the output voltage, a target voltage, is changed. FIGS. 7A and 7B show two examples of response in the case of the gain converter 24 having a linear gain characteristic, in which FIG. 7A shows an example of response when the setting value of output voltage is changed from 25 V to 30 V and an operation with an input-output conversion ratio G in FIG. 2 is nearly one. FIG. 7B shows an example of response when the setting value of output voltage is changed from 40 V to 48 V and an operation with an input-output conversion ratio G in FIG. 2 is around 2 to 3. As clearly shown in FIG. 7B, under the condition of a high value of the input-output conversion ratio G of the current resonant converter section 10, the DC output voltage Vout exhibits a large overshooting and a settling time to a new setting value of output voltage is also long.

Next, a description is made in the following for the construction according to the invention about the case in which the gain converter 24 has a non-linear gain characteristic. In this case, an input-output conversion ratio G of the current resonant converter section 10 with respect to a switching period Ts is given by the curve of FIG. 2, and the gain characteristics of FIG. 5 are given to the gain converter 24 to achieve the ideal characteristic Ga_ideal indicated by the solid line in FIG. 3. More specifically, for approximation to the ideal characteristics, the values of gain in the segmented regions are: 1 up to the point 'a', 4 in the region a-b, 2 in the region b-c, 1 in the region c-d, 0.5 in the region d-e, and 1 above the point 'e'.

Because the gain converter 24 handles integers, the values of gain in the segmented regions are doubled to: 2, 8, 4, 2, 1, and 2. The output of the gain converter 24 is set to ten bits after adding one bit. In this case, operation until output from the A-D converter 23 is as same as the operation described previously; the output voltage detector 21 delivers the error signal Ve that is the difference between the DC output voltage Vout and the target voltage; and the A-D converter 23 converts an analog signal corresponding to the error signal Ve received through the isolator 22 into a digital value. The output from the A-D converter 23 is given to the gain converter 24 where the value is identified and multiplied by an appropriate value of gain. Actually, since the gain is set at an N-th power of 2, a bit-shift is conducted. The output from the gain converter 24 comes out with 10 bits and given to the frequency generator 25. The construction of the frequency generator 25 is the same as the one shown in FIG. 6. In this example, however, the input is increased by one bit. Thus, in order to achieve the same target specification, the oscillation period of the oscillator 34 is made at 20 nsec and the counter 35 is made having an 11 bit structure, upgrading the performance of the components of the frequency generator 25. Nevertheless, the upgrading is confined within increase of only one bit.

For this construction, a simulation has been conducted like the one shown in FIGS. 7A and 7B. FIGS. 8A and 8B show the response characteristics of the simulation results. As shown in FIG. 8A, the response characteristic of the DC output voltage Vout is not deteriorated when the setting value of the output voltage is changed in the region of low gain of the current resonant converter section 10. As shown in FIG. 8B, by adding a gain converter 24 having a nonlinear gain characteristic, the response characteristic of the DC output voltage Vout demonstrates a suppressed overshooting and a good performance when the setting value of the output voltage is changed in the region of high gain of the current resonant converter section 10.

Figure 9:
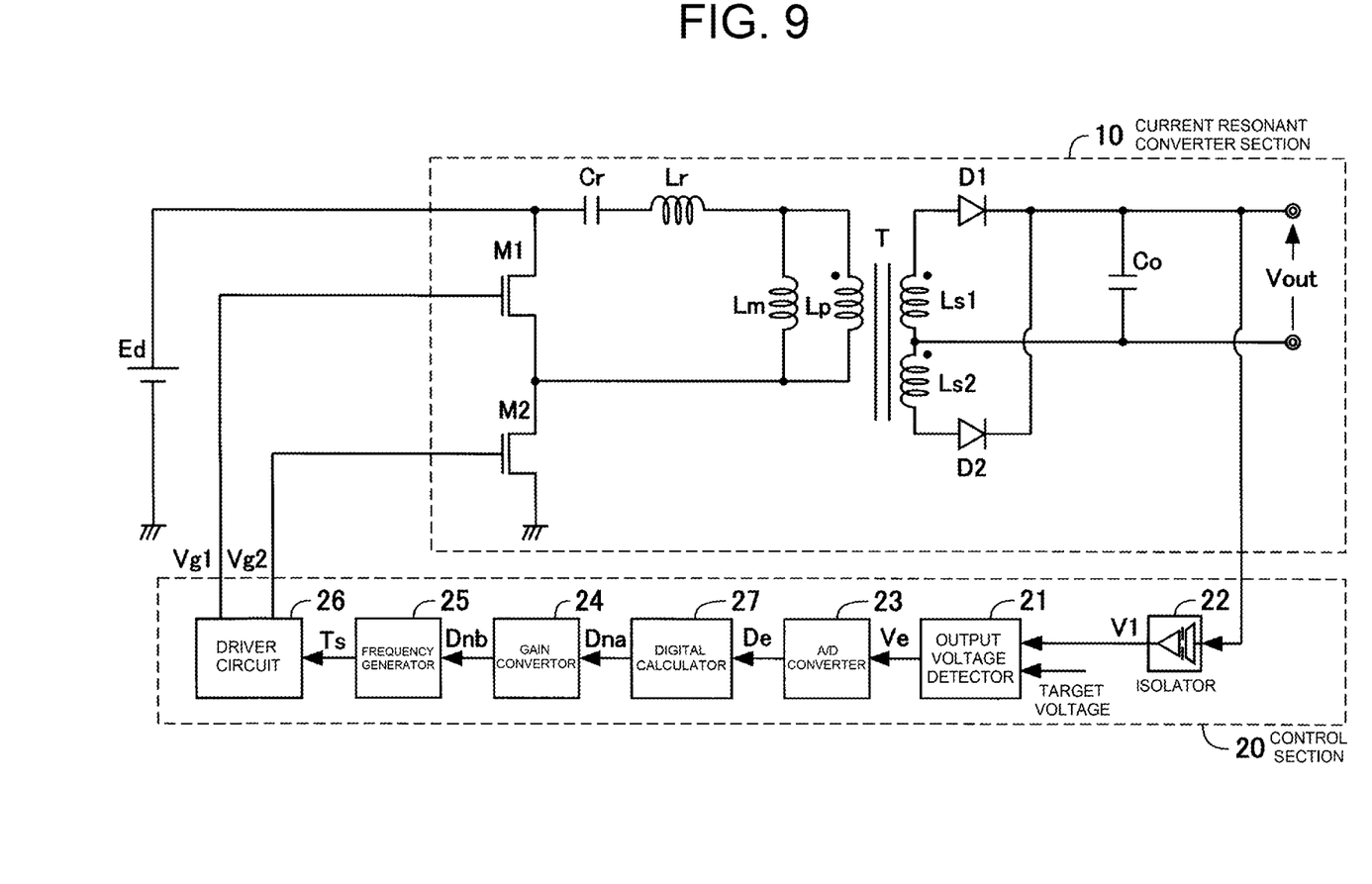
FIG. 9 shows an example of construction of a current resonant type converter to which a control device of a switching power supply according to a second embodiment of the present invention is applied.

FIG. 9 shows an example of construction of a current resonant converter to which a control device of a switching power supply according to a second embodiment of the present invention is applied.

The control section 20 of this second embodiment uses an isolation amplifier for an isolator 22 to transmit a signal from the secondary side to the primary side of the transformer T, and a DC output voltage Vout of the current resonant converter section 10 is directly given to the isolator 22. An output voltage detector 21 receives the output signal from the isolator 22 and delivers an error signal Ve with respect to a target voltage. The output signal of the output voltage detector 21 is given to an A-D converter 23, where an analog quantity of the error signal Ve is converted into a digital signal De. The output of the A-D converter 23 is given to a digital calculator 27, where control calculation is executed to converge the DC output voltage Vout to a setting value of the output voltage. The digital calculator 27 uses an calculator that conducts proportional and integral (PI) control or proportional, integral, and differential (PID) control. The output of the digital calculator 27 is given to the gain converter 24, where an input signal Dna is converted according to a gain characteristic set in the gain converter 24 and delivers an output signal Dnb. The output of the gain converter 24 is given to a frequency generator 25, which generates a pulse waveform signal having a switching period Ts corresponding to the output signal Dnb of the gain converter 24. The output of the frequency generator 25 is given to a driver circuit 26, where control signals Vg1 and Vg2 for controlling two switching elements M1 and M2 are generated and delivered.

In the control section 20, the value of the DC output voltage Vout of the current resonant converter section 10 is sent to the primary side of the transformer T and the error signal Ve between the DC output voltage Vout and the target voltage is detected and then converted into a digital signal. The control section 20 of the second embodiment of the current resonant converter converts the error signal Ve into a digital signal De, on which control calculation is executed using PI control or PID control to converge to the setting value of the output voltage. Whereas the output signal after the control calculation by the digital calculator 27 is a signal corresponding to the input signal Dna to the gain converter 24 in the first embodiment, more stable control is possible with a smaller residual deviation from the target voltage and less hunching phenomena.

A digital signal similar to the one in the first embodiment is sent to the gain converter 24. Therefore, the operation in the gain converter 24 and in the down-stream is similar to the control section 20 in the first embodiment. The characteristics to be given to the gain converter 24, which are determined by the characteristics of the current resonant converter and output specifications of the frequency generator 25, are also similar to the ones given to the gain converter 24 in the first embodiment.

While some preferred embodiments of the invention are described so far, the present invention is not limited to those embodiments, but the invention can be applied to any variations and modifications within the spirit and scope of the invention. For example, in the nonlinear gain characteristics in the gain converter 24, the gain in each of the divided regions is set to be N-th power of 2 of the basic gain. However, the data of the nonlinear gain can be preliminarily stored in a read only memory (ROM). Gain conversion can be carried out by reading out from the ROM the value that corresponds to an input signal Dna to obtain an output signal Dnb.

More specifically, the characteristics of FIG. 4 and FIG. 5 are represented not by varying the output signal Dnb for the input signal Dna in N-th power of 2, but by writing into a ROM the data of the points (Dnai, Dnbi), (i=1, 2, 3, . . . ) that represent the curve of FIG. 4. In a process of control, an output signal Dnb for an input signal Dna between Dnai and Dna(i+1) is obtained by interpolation calculation between the points (Dnai, Dnbi) and (Dna(i+1), Dnb(i+1)). So, the output signal Dnb is calculated by the following equation.

$$Dnb=Dnbi+(Dnb(i+1)-Dnbi)*(Dna-Dnai)/(Dna(i+1)-Dnai)$$

This method can enhance control accuracy of a current resonant converter by easily achieving a higher order non-linear gain characteristics without complicated conversion operation.

By providing an external communication interface in the construction having a flash memory for writing in the nonlinear gain coefficients, the nonlinear gain coefficients can be externally rewritten as desired through the interface.

DESCRIPTION OF SYMBOLS

10: current resonant converter section
20: control section
21: output voltage detector
22: isolator
23: A/D converter (analog-digital converter)
24: gain converter
25: frequency generator
26: driver circuit
27: digital calculator
31: first comparator
32: multiplier
33: second comparator
34: oscillator
35: counter

What is claimed is:

1. A control device of a switching power supply that has a current resonant converter section, the control device comprising:
an output voltage detector that detects an error between a DC output voltage of the current resonant converter section and a target voltage and delivers an error signal;
an analog-digital converter that converts the error signal detected by the output voltage detector into a digital signal;
a gain converter that receives the digital signal delivered by the analog-digital converter; and
a frequency generator that changes an output signal period to determine a switching period of the switching power supply in proportion to a digital signal delivered by the gain converter and generates an output signal of a rectangular waveform signal with a duty ratio of 50%;
wherein the gain converter sets a gain characteristic from an input to output of the gain converter so that a nonlinear gain characteristic of the gain converter compensates a nonlinear input-output characteristic of the current resonant converter section in a predetermined input range;
wherein the gain converter continuously sets a nonlinear gain approximate to the nonlinear gain characteristic in a period range for gain conversion; and
wherein the nonlinear gain is calculated by a cubic equation or an approximation equation having a higher order than a cubic equation.

2. The control device of a switching power supply according to claim 1, further comprising a digital calculation device that is provided between the analog-digital converter and the gain converter and conducts calculation of proportional-integral control or proportional-integral-differential control in response to the digital signal from the analog-digital converter.

3. A control device of a switching power supply that has a current resonant converter section, the control device comprising:
an output voltage detector that detects an error between a DC output voltage of the current resonant converter section and a target voltage and delivers an error signal;
an analog-digital converter that converts the error signal detected by the output voltage detector into a digital signal;
a gain converter that receives the digital signal delivered by the analog-digital converter; and
a frequency generator that changes an output signal period to determine a switching period of the switching power supply in proportion to a digital signal delivered by the gain converter and generates an output signal of a rectangular waveform signal with a duty ratio of 50%;
wherein the gain converter sets a gain characteristic from an input to output of the gain converter so that a nonlinear gain characteristic of the gain converter compensates a nonlinear input-output characteristic of the current resonant converter section in a predetermined input range; and
wherein the gain converter divides a period range for gain conversion into a plurality of regions and discretely sets a linear gain approximate to the nonlinear gain characteristic for each region.

4. The control device of a switching power supply according to claim 3, wherein the gain converter sets the gain for each region at a value $2^N$ of a basic gain, N being an integer.

5. The control device of a switching power supply according to claim 3, further comprising a digital calculation device that is provided between the analog-digital converter and the gain converter and conducts calculation of proportional-integral control or proportional-integral-differential control in response to the digital signal from the analog-digital converter.

* * * * *